(12) United States Patent
Dohmann

(10) Patent No.: US 9,867,437 B1
(45) Date of Patent: Jan. 16, 2018

(54) LUGGAGE SYSTEM

(71) Applicant: Donald Dohmann, Forest, VA (US)

(72) Inventor: Donald Dohmann, Forest, VA (US)

(*) Notice: Subject to any disclaimer, the term of this patent is extended or adjusted under 35 U.S.C. 154(b) by 0 days.

(21) Appl. No.: 15/442,677

(22) Filed: Feb. 26, 2017

(51) Int. Cl.
| | | |
|---|---|---|
| *A45C 7/00* | (2006.01) | |
| *B62B 3/02* | (2006.01) | |
| *A45C 13/00* | (2006.01) | |
| *A45C 13/02* | (2006.01) | |
| *A45C 13/10* | (2006.01) | |
| *A45C 15/06* | (2006.01) | |
| *A45C 5/14* | (2006.01) | |
| *A45C 5/02* | (2006.01) | |
| *F21L 4/02* | (2006.01) | |
| *F21V 33/00* | (2006.01) | |
| *F21V 23/04* | (2006.01) | |
| *F21W 131/30* | (2006.01) | |

(52) U.S. Cl.
CPC .............. *A45C 7/0022* (2013.01); *A45C 5/02* (2013.01); *A45C 5/14* (2013.01); *A45C 13/005* (2013.01); *A45C 13/02* (2013.01); *A45C 13/103* (2013.01); *A45C 15/06* (2013.01); *B62B 3/02* (2013.01); *F21L 4/02* (2013.01); *F21V 23/0414* (2013.01); *F21V 33/0004* (2013.01); *F21W 2131/30* (2013.01)

(58) Field of Classification Search
CPC ........ A45C 5/14; A45C 13/03; B62B 2202/24
See application file for complete search history.

(56) References Cited

U.S. PATENT DOCUMENTS

| | | | | |
|---|---|---|---|---|
| 4,228,877 A | * | 10/1980 | Cothary ................. | A45C 5/146 16/113.1 |
| 8,333,271 B2 | * | 12/2012 | Gibson .................... | A45C 9/00 190/102 |
| 8,490,765 B2 | * | 7/2013 | Lee ......................... | A45C 5/146 190/18 A |
| 2002/0023812 A1 | * | 2/2002 | Bernbaum ............... | A45C 3/00 190/111 |

\* cited by examiner

*Primary Examiner* — Bryan A Evans
(74) *Attorney, Agent, or Firm* — RG Patent Consulting, LLC; Rachel Gilboy

(57) ABSTRACT

An improved luggage system is a piece of wheeled luggage with support arms attached to the bottom side which telescope outward, and pivot 90 degrees downward and lock into position, to allow the luggage to be in a raised position off the floor, so the user does not need to bend down to access the items within the luggage, or pick up the luggage and put it on a bed or other raised furniture for access. It further has additional folding panels with pockets for storing extra shoes and the like, and light bars attached along the inside of the top panel to illuminate the inside of the luggage.

12 Claims, 3 Drawing Sheets

LUGGAGE SYSTEM

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of luggage and more specifically relates to improved luggage with support arms on the sides which telescope outward, and pivot 90 degrees down and lock into position, to allow the luggage to be in a raised position off the floor, so the user does not have to bend down to access the items within the luggage, or pick up the luggage and put it on a bed or other raised furniture for access.

2. Description of the Related Art

When we travel, people need a storage means to pack our clothing and other personal items needed while we are away from home. Luggage is typically used for that purpose. When people get to their destination, their luggage is usually placed in their room or an area they will be staying. Depending on the location, the luggage is usually placed on the floor, and in some cases, on a stand in a closet. When placed on the floor, the user will need to bend down to access personal items within the luggage, which is inconvenient at best, and very taxing on the body in the case of elderly, or physically challenged individuals.

Ideally, luggage should provide durability and ease of access, and yet would operate reliably and be manufactured at a modest expense. Thus, a need exists for a reliable improved luggage system to avoid the above-mentioned problems.

BRIEF SUMMARY OF THE INVENTION

In view of the foregoing disadvantages inherent in the known luggage art, the present invention provides a novel luggage system. The general purpose of the present invention, which will be described subsequently in greater detail is to provide an improved luggage system with foldable and telescoping support legs which raise the luggage off the floor to allow a user to access the contents without bending or crouching. It further has additional folding panels for storing extra shoes and the like.

An improved luggage system is disclosed herein comprising a base member including at least one support arm attached to a bottom side of the base member and adapted to telescopingly extend outward from the base member and pivot 90 degrees downward into a locked position. The base member is substantially flat and adapted to support clothing and personal items thereon. A plurality of side members form a rectangular volume, and are connected to and extending upwards from the base member, with a zipper attached along a periphery of the plurality of side members. The base member, plurality of side members, and top member are formed from a material chosen from a group of materials consisting of nylon, plastic, cotton, and rayon.

A plurality of wheel members are attached to at least one side member and adapted to allow a person to roll the improved luggage system on a flat surface. It further has a top member including a zipper member attached along a periphery and adapted to connect with the zipper on the plurality of side members. The top member is pivotally attached along a length of at least one side member and adapted to pivot 180 degrees along its axis. A flexible panel member is attached along the length of an interior portion of at least one side member, and includes a plurality of pockets adapted to retain shoes and personal items therein. It is adapted to fold outside of, and down a side of one side member of the plurality of side members to access shoes and personal items within the plurality of pockets.

A light assembly is connected to the top member having a plurality of light bars electrically connected to each other, a power source electrically connected to the plurality of light bars, and a light switch electrically connected to the plurality of light bars and power source. The light assembly is attached to an inside portion of the top member to illuminate the rectangular volume as needed for a user to see clothing and personal items. The power source of the light assembly is formed as a replaceable battery.

The at least one support arm is formed as two support arms attached to the bottom side of the base member, which pivot and extend independently of each other, and are adapted to telescopingly extend outward from the base member and pivot 90 degrees downward into a locked position. When locked in a downward position, the two support arms are adapted to increase the distance between the improved luggage system and a floor surface, and are formed from material chosen from a group of materials consisting of steel, aluminum, carbon fiber, and graphite.

The present invention holds significant improvements and serves as an improved luggage system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention, improved luggage system constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to luggage and more particularly to an improved luggage system as used to improve the ability of a user to raise their luggage off the floor to a more desirable position which allows them to access the contents without bending or crouching.

Generally speaking, an improved luggage system is a piece of wheeled luggage with support arms on the sides which telescope outward, and pivot 90 degrees downward and lock into position, to allow the luggage to be in a raised position off the floor, so the user does not need to bend down to access the items within the luggage, or pick up the luggage and put it on a bed or other raised furniture for access. It further has additional folding panels with pockets for storing extra shoes and the like, and light bars attached along the inside of the top panel to illuminate the inside of the luggage.

Figure 1:
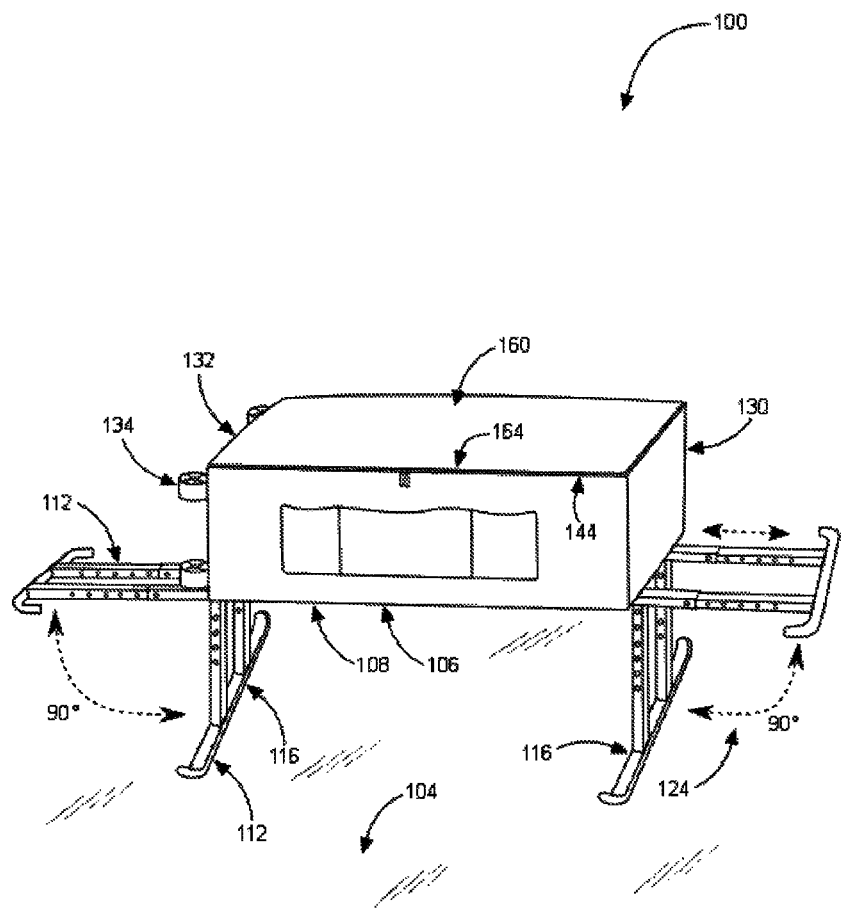
FIG. 1 shows a perspective view illustrating an improved luggage system having two support arms which pivot 90 degrees downward according to an embodiment of the present invention.

Referring to the drawings by numerals of reference there is shown in FIG. 1, a perspective view illustrating an improved luggage system 100 having two support arms 116 which pivot 90 degrees downward 124 according to an embodiment of the present invention.

Improved luggage system 100 is disclosed herein comprising base member 106 including at least one support arm 112 attached to bottom side 108 of base member 106 and adapted to telescopingly extend outward from base member 106 and pivot 90 degrees downward 124 into a locked position. Base member 106 is substantially flat 110 and adapted to support clothing and personal items thereon. Plurality of side members 130 form rectangular volume 138, and are connected to and extending upwards from base member 106, with zipper 144 attached along a periphery of plurality of side members 130. Base member 106, plurality of side members 130, and top member 160 are formed from a material chosen from a group of materials consisting of nylon, plastic, cotton, and rayon.

Figure 2:
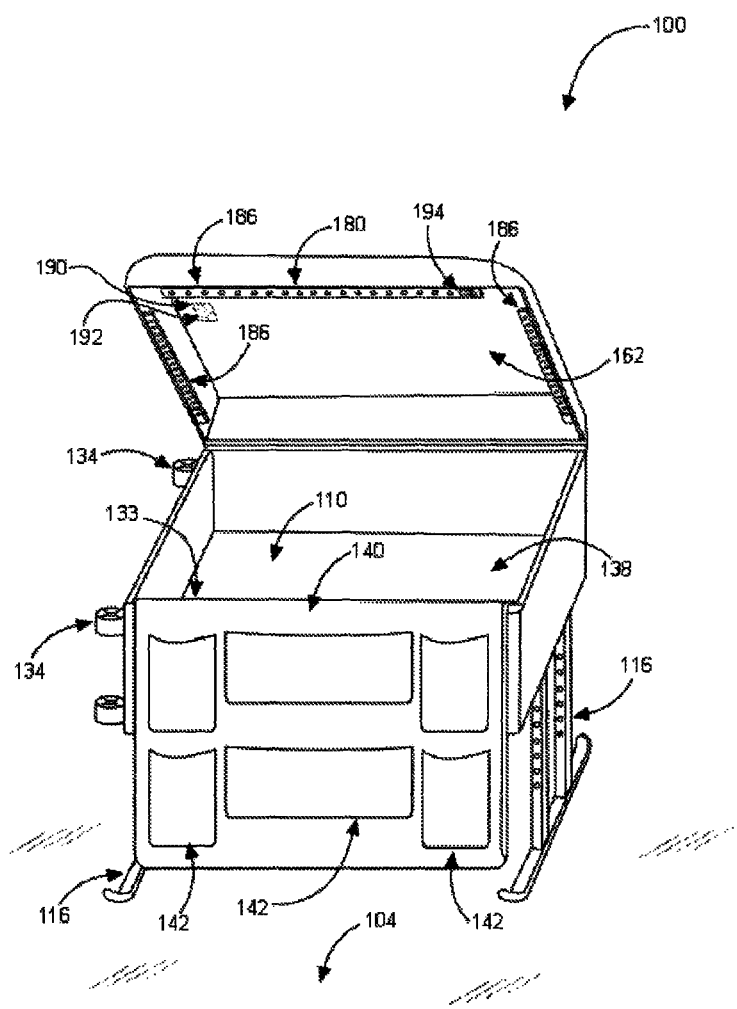
FIG. 2 is a perspective view illustrating an improved luggage system with open top member showing light assembly and flexible panel member according to an embodiment of the present invention of FIG. 1.

Referring now to FIG. 2, a perspective view illustrating an improved luggage system 100 with open top member 160 showing light assembly 180 and flexible panel member 140 according to an embodiment of the present invention.

Plurality of wheel members 134 are attached to at least one side member 132 and adapted to allow a person to roll improved luggage system 100 on floor surface 104. It further has top member 160 including zipper member 164 attached along a periphery and adapted to connect with zipper 144 on plurality of side members 130. Top member 160 is pivotally attached along a length of at least one side member 132 and adapted to pivot 180 degrees along its axis. Flexible panel member 140 is attached along the length of interior portion 133 of at least one side member 132, and includes plurality of pockets 142 adapted to retain shoes and personal items therein. It is adapted to fold outside of, and down a side of one side member 132 of plurality of side members 130 to access shoes and personal items within plurality of pockets 142.

Figure 3:
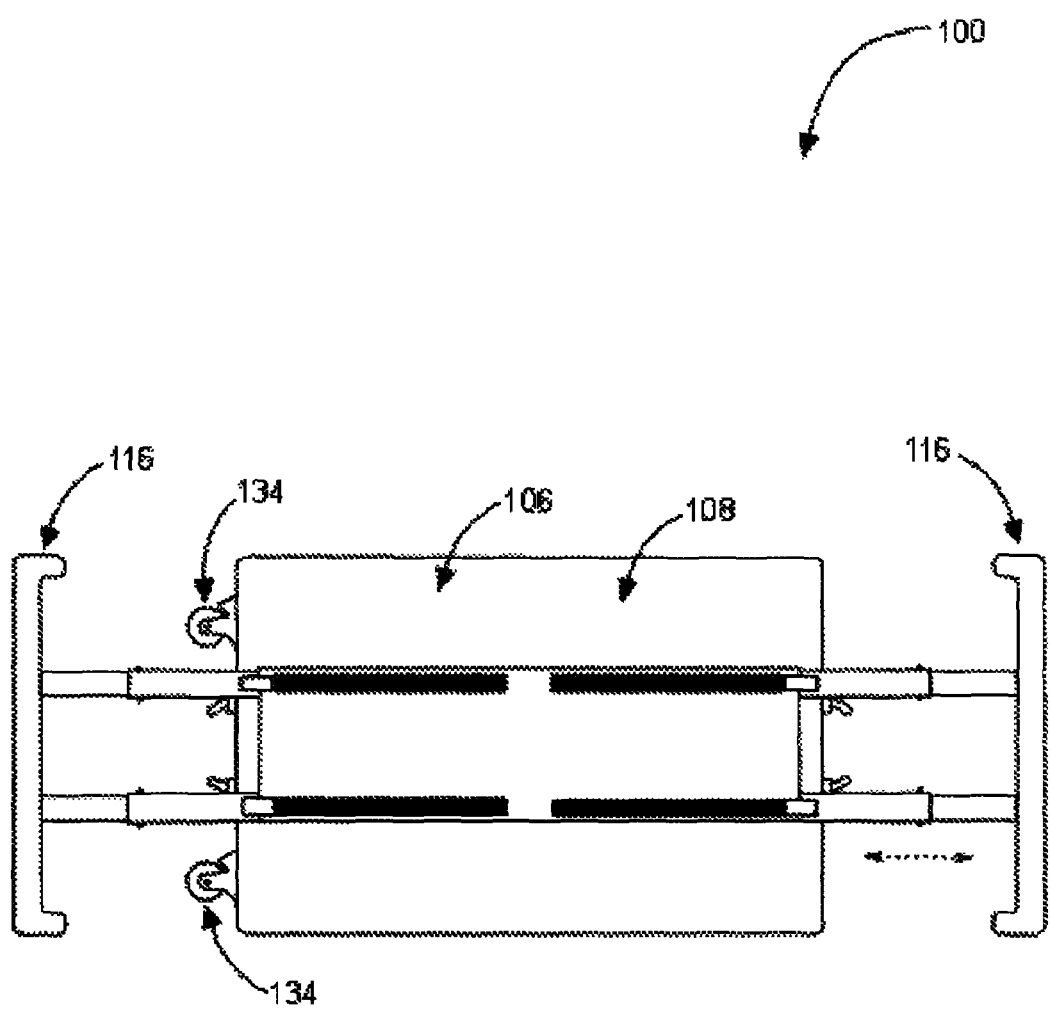
FIG. 3 is a bottom view illustrating an improved luggage system 100 according to an embodiment of the present invention of FIG. 1.

Referring now to FIG. 3, a bottom view illustrating an improved luggage system 100 according to an embodiment of the present invention.

Light assembly 180 is connected to top member 160 having plurality of light bars 186 electrically connected to each other, power source 190 electrically connected to plurality of light bars 186, and light switch 194 electrically connected to plurality of light bars 186 and power source 190. Light assembly 180 is attached to inside portion 162 of top member 160 to illuminate rectangular volume 138 as needed for a user to see clothing and personal items. Power source 190 of light assembly 180 is formed as replaceable batteries 192. The at least one support arm 112 is formed as two support arms 116 attached to bottom side 108 of base member 106, which pivot and extend independently of each other, and are adapted to telescopingly extend outward from base member 106 and pivot 90 degrees downward 124 into a locked position. When locked in a downward position, two support arms 116 are adapted to increase the distance between improved luggage system 100 and floor surface 104, and are formed from material chosen from a group of materials consisting of steel, aluminum, carbon fiber, and graphite.

Improved luggage system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., for example, including more or less components, customized parts, different color combinations, parts may be sold separately, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. An improved luggage system comprising:
   a base member including;
      at least one support arm attached to a bottom side of said base member and adapted to telescopingly extend outward from said base member and pivot 90 degrees downward into a locked position;
      wherein said base member is substantially flat and adapted to support clothing and personal items thereon;
   a plurality of side members forming a substantially rectangular shape including;
      a plurality of wheel members attached to at least one side member and adapted to allow a person to roll said improved luggage system on a flat planer surface;
      a zipper attached along a periphery of said plurality of side members;

wherein said plurality of side members are connected to and extending upwards from said base member;
a top member including;
   a zipper member attached along a periphery and adapted to releasably connect with said zipper of said plurality of side members;
   wherein said top member is pivotally attached along a length of at least one said side member and adapted to pivot 180 degrees along its axis;
a flexible panel member including;
   a plurality of pockets attached thereon and adapted to contain shoes and personal items therein; and
a light assembly connected to said top member including;
   a plurality of light bars electrically connected to each other;
   a power source electrically connected to said plurality of light bars; and
   a light switch electrically connected to said plurality of light bars and said power source.

2. The improved luggage system of claim 1 wherein said plurality of side members forms a rectangular volume within said improved luggage system allowing said user to place clothing and said personal items therein for storage, transportation, and ease of access.

3. The improved luggage system of claim 1 wherein said at least one support arm is formed as two support arms attached to said bottom side of said base member and adapted to telescopingly extend outward from said base member and pivot 90 degrees downward into a locked position.

4. The improved luggage system of claim 3 wherein said two support arms pivot and extend independently of each other.

5. The improved luggage system of claim 3 wherein said two support arms are adapted to increase a distance between said improved luggage system and a floor surface.

6. The improved luggage system of claim 3 wherein said two support arms are formed from material chosen from a group of materials consisting of steel, aluminum, carbon fiber, and graphite.

7. The improved luggage system of claim 1 wherein said flexible panel member is attached along a length of an interior portion of at least one said side member.

8. The improved luggage system of claim 7 wherein said flexible panel member is adapted to retain shoes and personal items within said plurality of pockets attached thereon.

9. The improved luggage system of claim 1 wherein said light assembly is attached to an inside portion of said top member to illuminate said rectangular volume as needed for said user to see said clothing and said personal items.

10. The improved luggage system of claim 9 wherein said power source of said light assembly is formed as a replaceable battery.

11. The improved luggage system of claim 8 wherein said flexible panel member is adapted to fold outside of, and down a side of one side member of said plurality of side members to access said shoes and said personal items within said plurality of pockets.

12. The improved luggage system of claim 1 wherein said base member, said plurality of side members, and said top member are formed from a material chosen from a group of materials consisting of nylon, plastic, cotton, and rayon.

* * * * *